United States Patent
Martins et al.

(10) Patent No.: US 9,616,529 B2
(45) Date of Patent: Apr. 11, 2017

(54) PISTON AND METHOD OF MAKING A PISTON

(75) Inventors: Airton Martins, Granger, IN (US); Carmo Ribeiro, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 816 days.

(21) Appl. No.: 13/446,683

(22) Filed: Apr. 13, 2012

(65) Prior Publication Data

US 2012/0260882 A1    Oct. 18, 2012

Related U.S. Application Data

(60) Provisional application No. 61/476,008, filed on Apr. 15, 2011.

(51) Int. Cl.
| | |
|---|---|
| *F02F 3/26* | (2006.01) |
| *B23P 15/10* | (2006.01) |
| *B23B 1/00* | (2006.01) |
| *F02F 3/00* | (2006.01) |
| *F02F 3/22* | (2006.01) |

(52) U.S. Cl.
CPC ............... *B23P 15/10* (2013.01); *B23B 1/00* (2013.01); *F02F 3/003* (2013.01); *B23B 2215/245* (2013.01); *F02F 3/22* (2013.01); *Y10T 29/49252* (2015.01)

(58) Field of Classification Search
USPC ...... 123/193.6, 193.1, 193.4, 195 R; 92/222, 92/208, 187, 188; 29/888.042, 888.01, 29/888.044, 888.047
See application file for complete search history.

(56) References Cited

U.S. PATENT DOCUMENTS

| | | | | |
|---|---|---|---|---|
| 3,460,239 A | * | 8/1969 | Nix ......................... | B23B 31/19 269/47 |
| 3,915,141 A | | 10/1975 | Ottl | |
| 3,930,472 A | | 1/1976 | Athenstaedt | |
| 4,079,661 A | * | 3/1978 | Goloff ..................... | B23P 15/10 164/109 |
| 4,831,919 A | * | 5/1989 | Bruni ...................... | F02F 3/022 123/193.6 |

(Continued)

FOREIGN PATENT DOCUMENTS

| | | |
|---|---|---|
| CN | 1729718 A | 2/2006 |
| CN | 1735763 A | 2/2006 |

(Continued)

OTHER PUBLICATIONS

International Search Report mailed on Jul. 3, 2012 (PCT/US2012/033555).

*Primary Examiner* — Long T Tran
(74) *Attorney, Agent, or Firm* — Robert L. Stearns; Dickinson Wright, PLLC

(57) ABSTRACT

A one-piece piston including a combustion bowl which is cast to its final form and includes at least one irregularity spaced from a central axis. The piston is initially fabricated of an upper crown member and a lower crown member, which are joined together. The piston is then chucked into a machine tool, such as a CNC lathe, which locates either the piston's top surface or a portion of the combustion bowl and establishes its location as a datum plane. It is this datum plane which serves as a reference location for subsequent machining operations of the piston.

31 Claims, 4 Drawing Sheets

(56) References Cited

U.S. PATENT DOCUMENTS

| | | | |
|---|---|---|---|
| 4,876,947 A | 10/1989 | Rhodes | |
| 4,939,984 A | 7/1990 | Fletcher-Jones | |
| 4,989,559 A | 2/1991 | Fletcher-Jones | |
| 5,081,968 A | 1/1992 | Bruni | |
| 5,913,960 A * | 6/1999 | Fletcher-Jones | F02F 3/0015 123/193.4 |
| 6,244,161 B1 | 6/2001 | Myers | |
| 6,491,013 B1 | 12/2002 | Gaiser | |
| 6,513,477 B1 | 2/2003 | Gaiser | |
| 6,539,910 B1 | 4/2003 | Gaiser | |
| 6,825,450 B2 | 11/2004 | Ribeiro | |
| 7,005,620 B2 | 2/2006 | Ribeiro | |
| 7,185,575 B1 * | 3/2007 | Collier | F41F 3/04 89/1.8 |
| 7,406,941 B2 | 8/2008 | Zhu | |
| 7,472,674 B2 | 1/2009 | Robelet | |
| 7,503,304 B2 | 3/2009 | Otsuka | |
| 7,938,093 B2 | 5/2011 | Rasmussen | |
| 2003/0150418 A1 * | 8/2003 | Barnes | F02F 3/0084 123/193.6 |
| 2003/0188633 A1 * | 10/2003 | Griffiths | F02F 3/0023 92/208 |
| 2006/0086325 A1 | 4/2006 | Rasmussen | |
| 2006/0086326 A1 | 4/2006 | Rasmussen | |
| 2006/0207424 A1 | 9/2006 | Gaiser | |
| 2007/0062479 A1 | 3/2007 | Tanihata et al. | |
| 2007/0113802 A1 | 5/2007 | Mihara | |
| 2007/0235003 A1 | 10/2007 | Cagney | |
| 2008/0034961 A1 | 2/2008 | Rasmussen | |
| 2008/0066615 A1 | 3/2008 | Rasmussen | |
| 2009/0025550 A1 * | 1/2009 | Benz | B22C 9/105 92/186 |
| 2009/0178640 A1 | 7/2009 | Haug | |
| 2009/0194059 A1 | 8/2009 | Grahle | |
| 2010/0018613 A1 | 1/2010 | Novotny | |
| 2010/0329801 A1 | 12/2010 | Liang | |
| 2012/0048229 A1 | 3/2012 | Rasmussen | |

FOREIGN PATENT DOCUMENTS

| | | |
|---|---|---|
| EP | 0330005 A2 | 8/1989 |
| EP | 0394915 A1 | 10/1990 |
| FR | 2834001 A1 | 6/2003 |
| GB | 2250938 A | 6/1992 |
| JP | S559543 B2 | 3/1980 |
| JP | 2007085224 A | 4/2007 |
| JP | 2007198228 A | 8/2007 |

\* cited by examiner

PISTON AND METHOD OF MAKING A PISTON

CROSS REFERENCE TO RELATED APPLICATION

This application claims the benefit of U.S. Provisional Application Ser. No. 61/476,008, filed Apr. 15, 2011.

BACKGROUND OF THE INVENTION

1. Field of the Invention

The invention relates generally to pistons, and more particularly to a piston having a combustion bowl and a method of making a piston with a combustion bowl.

2. Related Art

Many one-piece pistons for internal combustion engines have a crown and a skirt which are forged or cast to a near-final form as one integral piece. The piston is then typically machined through a conventional turning process to remove excess material formed during the forging or casting process and to give the one-piece piston its final form. A combustion bowl, which may be preferred for pistons for diesel fueled engines, may also be machined into the top surface of the crown during the turning process.

Other one-piece pistons are initially cast or forged as two separate pieces which are subsequently joined together. This may be advantageous over pistons of one integral piece as it may allow for complex features, such as oil galleries, to be formed into the piston which would otherwise be impossible, or at least commercially impractical, through conventional casting or forging processes. Once the two pieces are joined together, the one-piece piston is mounted on a conventional machine tool, such as a lathe, which machines certain features into the piston. Features which are typically machined into the piston are one or more ring grooves for supporting piston rings and a combustion bowl. A machinist typically uses a bottom surface of the skirt as a datum, or reference, plane when machining these features into the piston. The combustion bowl may be given a traditional "Mexican Hat" configuration that is typically associated with diesel engine type pistons. The traditional shape is readily formed by turning wherein a cutting tool machines away material from the initial surface of the bowl bowl in one or multiple operations to achieve the final finish.

SUMMARY OF THE INVENTION

The piston of at least one aspect of the present invention is unique in part because the portion of the piston containing the combustion bowl is cast to final form including at least one irregularity spaced from a central axis and not extending circumferentially around the axis. Such irregularities may improve the piston's performance and/or its durability. This is different than conventional pistons for diesel engine applications which lack such irregularities since they cannot be formed through conventional machining processes. The casting of the combustion bowl to its final form also provides a significant benefit since it eliminates the need for subsequent machining of the combustion bowl.

The combustion bowl is surrounded by an annular top surface, and this top surface is either cast into its final form or machined to its final form after the casting process but before this portion of the piston is joined to any other portions. As such, these two features (combustion bowl and top surface) are established in their respective final forms very early in the manufacturing process.

According to an aspect of the invention, the combustion bowl is formed in an upper crown member through investment casting. The top surface of the upper crown member is also cast into its final form or machined to its final form very early in the manufacturing process. Therefore, a piston manufacturer may utilize complex shapes of the bowl that may be commercially difficult if not impossible to form by conventional machining techniques, it presents a real challenge for the subsequent machining operations because it has the effect of setting the combustion bowl or top surface as the principle datum reference plane for subsequent joining and machining operations. This is completely backwards to the machining sequence for the conventional one-piece pistons with conventional combustion bowl shapes, in which the finishing of the combustion bowl is near to the last machining operation performed on the piston, and is referenced from a combination of several datum points that are established through earlier machining operations on other parts of the piston. However, the casting process enables the piston manufacturer to precisely locate the top surface and combustion bowl relative to the other datum points of the piston. As such, for a piston of the type where the combustion bowl is investment cast to final form according to the present invention, a different machining operation is required in order to meet the very strict required tolerance limits of these types of pistons.

According to an aspect of the invention, the lower crown member may be cast, forged, fabricated of powder metal or by other techniques that are well known to the industry. Both the upper and lower crown parts are preferably fabricated of steel, the particular grade of which will depend on the particular application, economics, etc. At least the upper crown member may be investment cast of AHSS (advanced high strength steel) grade of steel. The lower crown part may be forged of the same or different grade of steel as that used for the upper crown portion.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

A method for making a piston 20 according to a presently preferred embodiment of the invention is illustrated sequentially through FIGS. 1-6, which depict the piston 20 during various stages of its formation.

Figure 1:
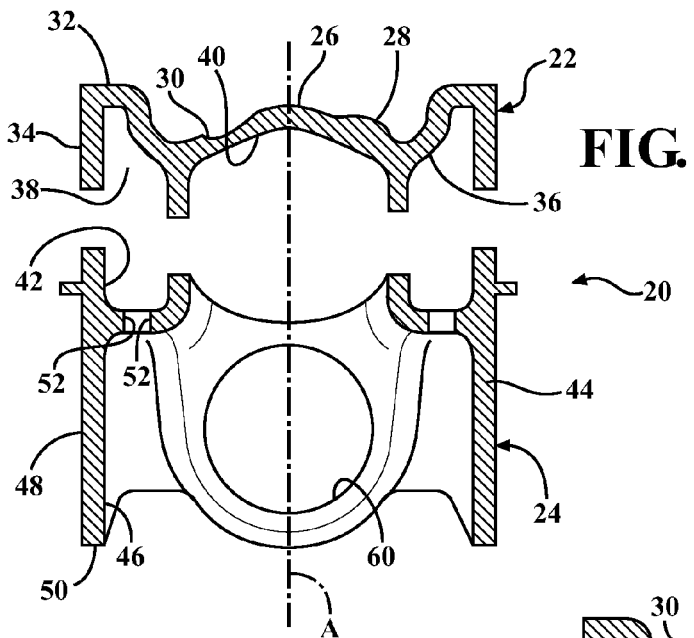
FIG. 1 is a cross-sectional and exploded view of the upper and lower crown members of the exemplary piston.

FIG. 1 shows the piston 20 including a single piece upper crown member 22 and a single piece lower crown member 24, and wherein the upper and lower crown members 22, 24 are formed as discrete components from one another. The upper crown member 22 is preferably precision (or investment) cast to include a combustion bowl 26 having at least one irregularity spaced radially from a central axis A but not extending in a uniform manner circumferentially around the central axis A. In the exemplary embodiment, the upper crown member 22 is formed with one projection irregularity 28 and one recess irregularity 30. However, it should be appreciated that the combustion bowl 26 could include any number of irregularities 28, 30, and those irregularities 28, 30 could take any desirable shape. Even further, if desired, the irregularity could extend circumferentially around the central axis A but vary in height or any other dimension around the circumference, and thus not extend in a uniform manner circumferentially around the central axis A. Additionally, if desired, the irregularities 28, 30 could be disposed around the central axis A in a pattern. The upper crown member 22 is cast such that the combustion bowl 26 is in its final form after the casting process is complete, and thus, the combustion bowl 26 does not require any subsequent machining processes.

The upper crown member 22 is also cast to include an annular top surface 32 which circumferentially surrounds the combustion bowl 26 and a ring belt 34 which extends downwardly from the annular top surface 32 along the outer circumference of the upper crown member 22. In addition to the combustion bowl 26, the top surface 32 is preferably cast directly to its final form without any subsequent machining processes. Alternately, the top surface 32 of the upper crown member 22 could be finished to its final form after the casting process is complete. Either way, both the combustion bowl 26 and the top surface 32 are in their respective final finish forms before the upper and lower crown members 22, 24 are joined to one another. In addition, if necessary, an upper portion 36 of an oil gallery 38 and an undercrown 40 of the combustion bowl 26 may be machined into the upper crown member 22 before the upper and lower crown members 22, 24 are joined together, but these also are preferably cast directly into their respective final forms and are not machined.

The lower crown member 24 could also be precision (or investment) cast, but it may alternately be fabricated through any suitable process, including other types of casting, forging, powder metal, or machining from a billet to name a few. FIG. 1 also shows the lower crown member 24, following its initial formation, as being pre-machined prior to joining with the upper crown member 22. The lower crown member 24 includes a lower portion 42 of the oil gallery 38 and a skirt portion 44 with an internal face 46, an external face 48 and a bottom surface 50, as is traditional with the manufacture of the bottom portion of one-piece pistons. Additionally, at this stage, oil gallery holes 52 (inlet and outlet) are preferably machined into the lower portion 42 of the oil gallery 38 for receiving and draining oil (or any other fluid) into and out of the oil gallery 38 as is traditional. However, the oil gallery holes 52 could alternately be machined into the lower crown member 24 at a later point in the manufacturing process.

The upper crown member 22 is preferably formed of steel such as advanced high strength steel (AHSS) but could alternately be formed of a variety of other materials depending on its particular application. The lower crown member 24 may be fabricated of the same or a different grade of steel or even of an entirely different material than the upper crown member 22.

Figure 2:
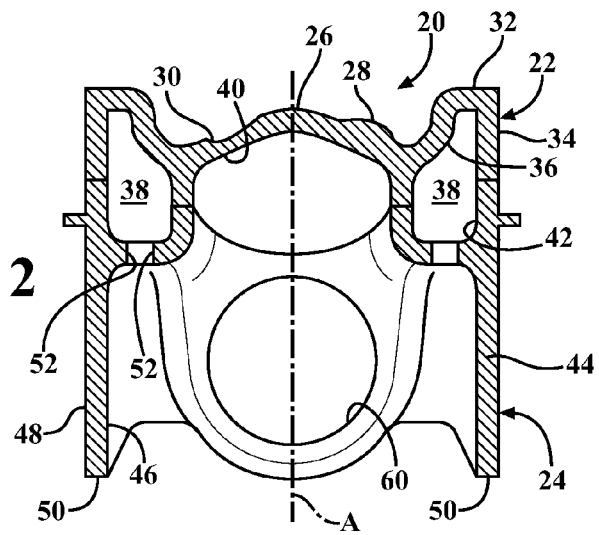
FIG. 2 is a cross-sectional view of the exemplary piston after the upper and lower crown members are joined together.

FIG. 2 illustrates the upper and lower crown members 22, 24 after being joined together. The upper and lower members 22, 24 are preferably permanently joined together through frictional welding, induction welding, resistance welding, laser welding, charge carrier rays, soldering, gluing, synching, mechanical deformation, etc. Alternately, the upper and lower crown members 22, 24 could be detachably joined through, for example, screwing or bolting. In the exemplary embodiment, the upper and lower crown members 22, 24 are joined to one another by friction welding.

Figure 3:
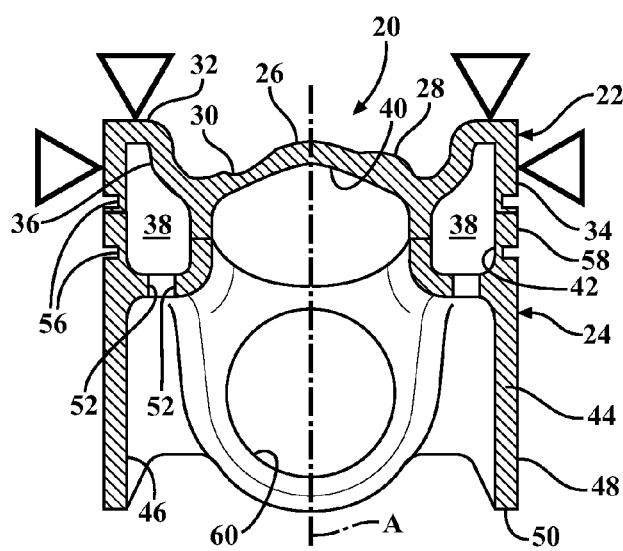
FIG. 3 is a cross-sectional view of the exemplary piston after a first machining process and indicating a first datum plane used for the machining and the location where the piston was chucked into a machine tool.
Figure 8:
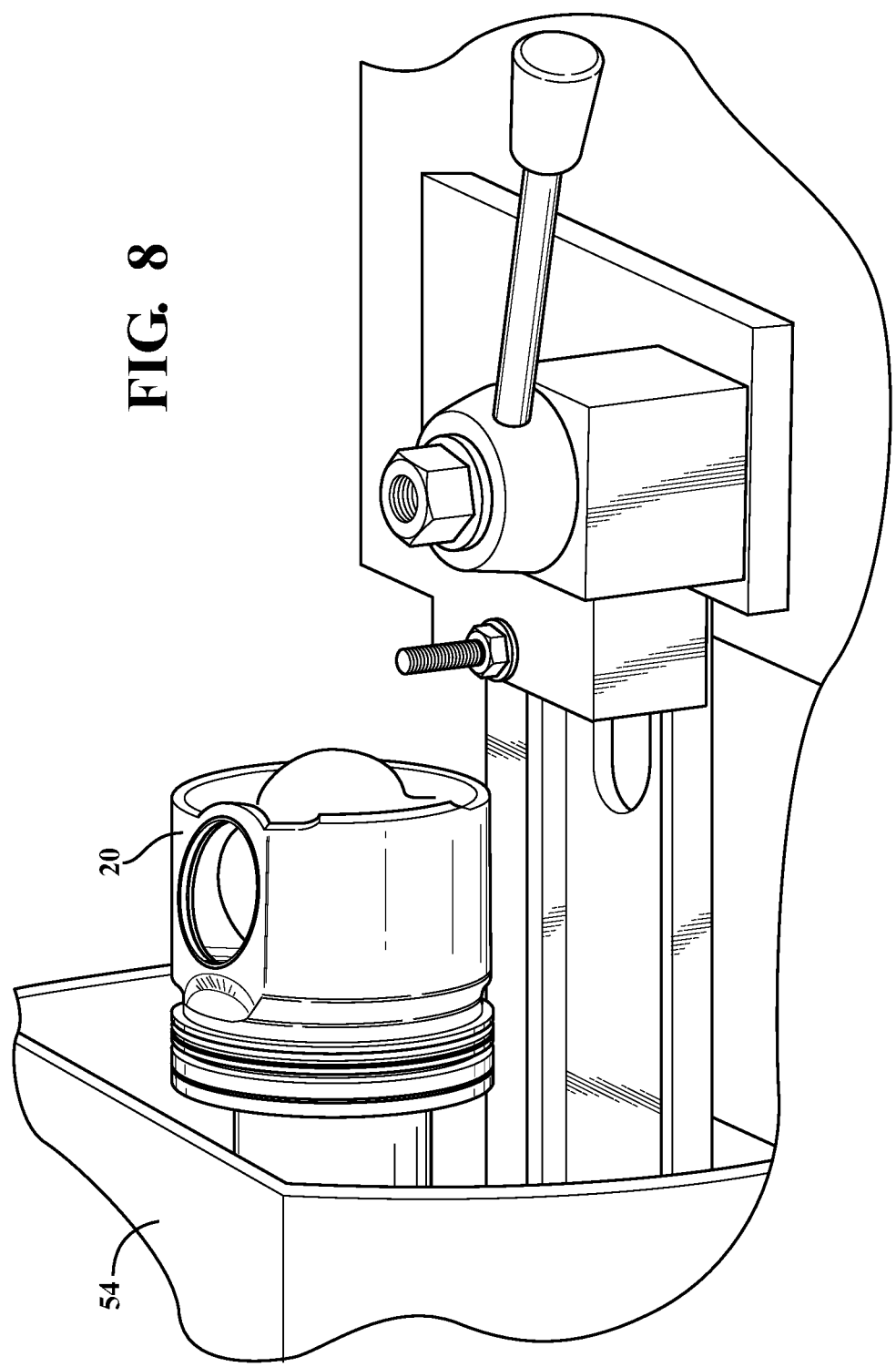
FIG. 8 is a perspective and elevation view of an exemplary piston being chucked into an exemplary machine tool.

FIG. 3 shows the next sequence of finishing operations following the joining of the upper and lower crown members 22, 24. The piston 20 is chucked into a machine tool 54, such as the computer numerical control (CNC) lathe shown in FIG. 8, with the machine tool 54 being clamped onto the top outer diameter of the ring belt 34. The machine tool 54 then locates either the prefinished top surface 32 or a portion of the prefinished combustion bowl 26 and establishes its position as a first datum plane, i.e., the top surface 32 or the combustion bowl 26 serves as a reference surface for locating the piston 20 in the machine tool 54 for the machining operations to be performed by the machine tool 54. The locations of the chucking and the first datum plane are indicated in FIG. 3 with triangles. Once properly chucked and located, machining operations such as turning are performed based on the datum plane to machine at least one ring groove 56 into the ring belt 34 and to qualify at least a portion the outer diameter of the skirt portion 44. In the exemplary embodiment, two ring grooves 56 are machined into the ring belt 34 at this stage of the manufacturing process.

Figure 4:
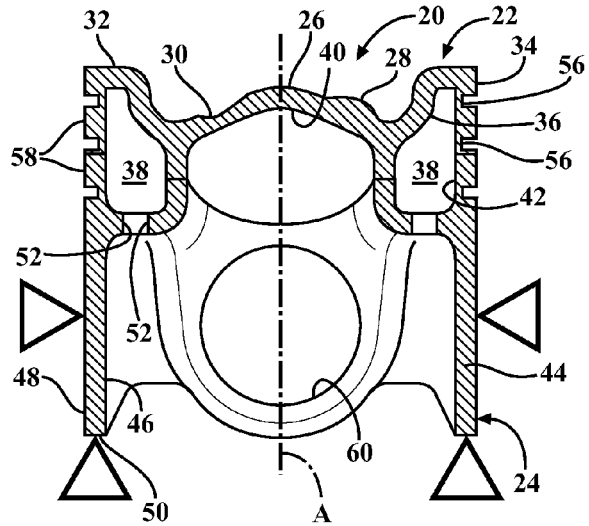
FIG. 4 is a cross-sectional view of the exemplary piston after a second machining process and indicating a second datum plane used for the machining and the location where the piston was chucked into a machine tool.

FIG. 4 illustrates the next sequence in the exemplary machining process. The piston 20 from FIG. 3 is detached from the machine tool 54 and clamped to the same or a different machine tool 54 along the outer diameter of the skirt portion 44. In the exemplary process, the machine tool 54 then locates the bottom surface 50 or any other surface of the skirt portion 44 and establishes its position as a second datum plane. Once the piston 20 is properly mounted and located, the machine tool 54 proceeds with finishing all of the ring grooves 56 in the ring belt 34 as well as the lands 58 adjacent to the ring grooves 56. Additionally, at this point in the exemplary process, the machine finishes the top land 58 diameter, which was previously chucked into the machine tool 54 during the step shown in FIG. 3, to its final form.

Figure 5:
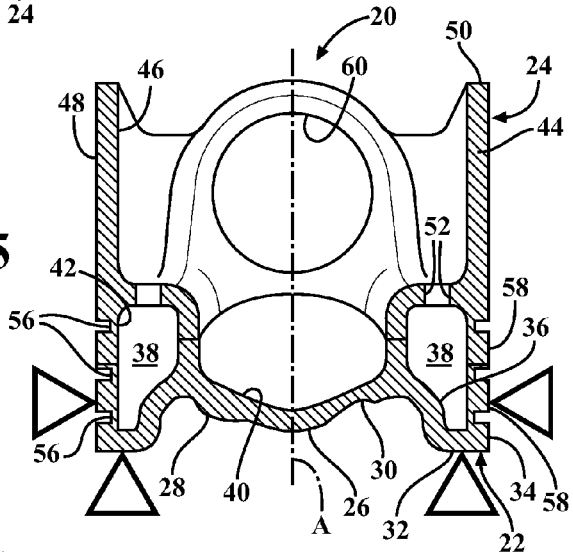
FIG. 5 is a cross-sectional view of the exemplary piston after a third machining process and indicating a third datum plane used for the machining and the location where the piston was chucked into a machine tool.

FIG. 5 illustrates the next machining operation performed on the piston 20. The machine tool 54 is released from its engagement with the outer diameter of the skirt portion 44, and the piston 20 is chucked to the same or a different machine tool 54 along the outer diameter of the top land 58 between the upper-most ring grooves 56. Next, the machine tool 54 locates the annular top surface 32 and establishes its position as a third datum plane. Once the piston 20 is properly mounted and located, the machine tool 54 machines the pin bore 60 including a counter bore and a circlip diameter for receiving a circlip (not shown) to attach the piston 20 to a wrist pin (not shown) into their final forms.

Figure 6:
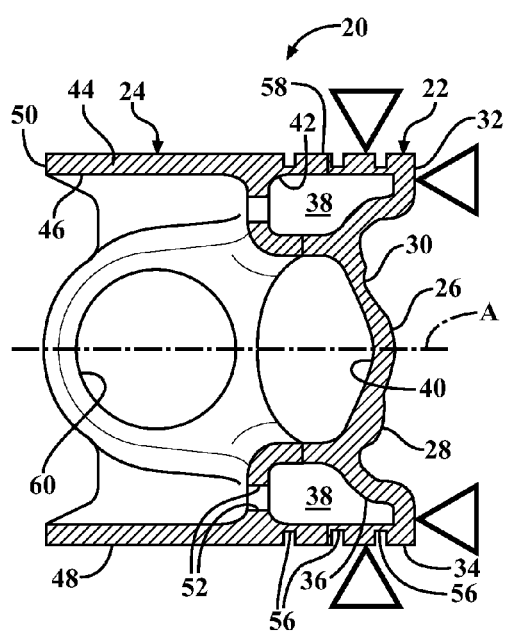
FIG. 6 is a cross-sectional view of the exemplary piston after a fourth machining process and indicating a fourth datum plane used for the machining and the location where the piston was chucked into a machine tool.

Referring now to FIG. 6, the next sequential machining operation performed on the piston 20 is shown. Once again, the piston 20 is released from the machine tool 54 and is chucked to the same or a different machine tool 54 along its top land 58 diameter. The machine tool 54 locates the annular top surface 32 of the piston 20 and establishes its position as a fourth datum plane. The machine tool 54 then finishes machining at least one of the lands 58 to its final form and finishes machining the outer surface of the skirt portion 44 to its final form.

Figure 7:
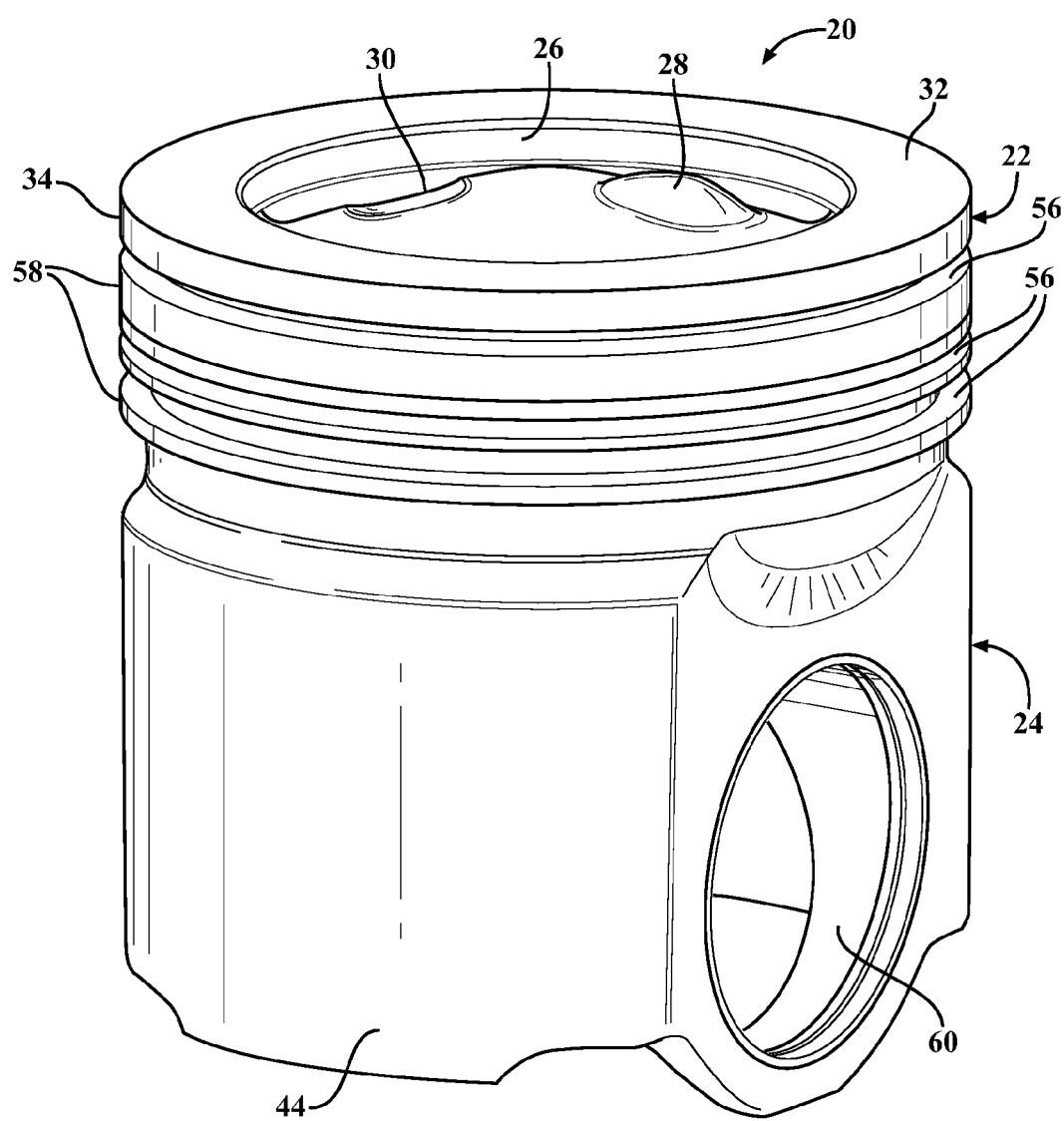
FIG. 7 is a perspective and elevation view of an exemplary piston formed from the processes shown sequentially in FIGS. 1-6.

An exemplary piston 20 formed from the process is generally shown in FIG. 7. As shown, the combustion bowl 26 has complex shape with a projection irregularity 28 and a recess irregularity 30, each of which would be commercially difficult if not impossible to form to their final forms and finished through traditional machining techniques (e.g., turning). The complex shape of the surface of the combustion bowl 26 may be advantageously reflected as the reverse image on the undercrown 40 by means of the precision casting process, and the piston 20 can retain a relatively uniform wall thickness across these complex features. The combustion bowl 26 surface may be shot blasted to refine the surface (e.g., decrease porosity) if desired, and this may take place at the beginning of the process (before the joining of the upper and lower crown members 22, 24), at the end of the machining process, or at any stage in between.

Obviously, many modifications and variations of the present invention are possible in light of the above teachings and may be practiced otherwise than specifically described while within the scope of the appended claims.

What is claimed is:

1. A method of making a piston comprising the steps of:
preparing a single piece cast upper crown member having a combustion bowl cast to a final form and a top surface adjacent the combustion bowl final form;
preparing a lower crown member as a discrete component separate from the upper crown member;
joining the upper and lower crown members together;
establishing the top surface or a portion of the combustion bowl of the upper crown member as a datum plane for at least one subsequent machining operation; and
machining at least a portion of the joined upper and lower crown members other than said top surface and combustion bowl based on the datum plane.

2. The method as set forth in claim 1 wherein the combustion bowl in its final form includes at least one irregularity spaced radially from a central axis and extending less than circumferentially around the central axis or extending in a non-uniform manner circumferentially around the central axis.

3. The method as set forth in claim 2 wherein the at least one irregularity is a projection.

4. The method as set forth in claim 2 wherein the at least one irregularity is a recess.

5. The method as set forth in claim 1 wherein the top surface of the upper crown member is also cast to its final form and wherein the top surface of the upper crown member is established as the datum plane.

6. The method as set forth in claim 1 wherein the lower crown member is formed as a single piece and includes a skirt portion and a pair of pin bosses.

7. The method as set forth in claim 6 further including the step of clamping a machine tool onto a top outer diameter of the piston before the step of establishing the top surface or a portion of the combustion bowl as a datum plane.

8. The method as set forth in claim 7 wherein the machining at least a portion of the piston is further defined as machining at least one ring groove into the outer diameter of the piston.

9. The method as set forth in claim 8 further including the steps of releasing the machine tool from the piston and clamping the same machine tool or another machine tool onto an outer surface of the skirt portion.

10. The method as set forth in claim 9 wherein the datum plane based on the top surface or a portion of the combustion bowl is a first datum plane and further including the step of establishing a surface of the skirt as a second datum plane.

11. The method as set forth in claim 10 wherein the second datum plane is a bottom surface of the skirt portion.

12. The method as set forth in claim 10 further including the step of machining at least a least one of the ring grooves and at least one land area adjacent to the ring grooves based on the second datum plane.

13. The method as set forth in claim 10 further including the steps of releasing the machine tool from the piston and clamping the same machine tool or a different machine tool onto one of the lands adjacent the ring grooves.

14. The method as set forth in claim 13 further including the steps of establishing either the top surface or a portion of the combustion bowl as a third datum plane and machining the pin bore based on the third datum plane.

15. The method as set forth in claim 14 further including the steps of releasing the machine tool from the one of the lands and clamping the same machine tool or another machine tool onto one of the lands.

16. The method as set forth in claim 15 further including the steps of establishing either the top surface or a portion of the combustion bowl as a fourth datum plane and machining at least one of a ring groove, a land, and the skirt portion based on the fourth datum plane.

17. The method as set forth in claim 1 wherein the piston includes an oil gallery formed entirely by the upper and lower crown members.

18. A method of forming a piston for a diesel fueled engine, comprising the steps of:
preparing a cast first crown portion with a combustion bowl and a top surface each cast to final form, and wherein the combustion bowl has at least one irregularity which is non-machinable through a turning process;
preparing a second crown portion and a skirt as a separate component from the first crown portion, and wherein the skirt has a pin bore and a bottom surface;
joining the first and second crown portions together with the top surface of the first crown portion facing in an opposite direction from the bottom surface of the skirt to form a unified piston;
establishing the top surface or a portion of the combustion bowl as a first datum plane;
machining an outer surface of the piston to form at least one ring groove and at least one land adjacent the at least one ring groove based on the first datum plane;
establishing the bottom surface of the skirt as a second datum plane;
machining the at least one ring groove and the at least one land based on the second datum plane;
establishing the top surface or a portion of the combustion bowl as a third datum plane; and machining the pin bore of the skirt based on the third datum plane.

19. The method as set forth in claim 18 wherein the at least one irregularity is a projection.

20. The method as set forth in claim 18 wherein the at least one irregularity is a recess.

21. The method as set forth in claim 18 further including the step of establishing either the top surface or a portion of the combustion bowl as a fourth datum plane.

22. The method as set forth in claim 21 further including the step of machining at least one of a ring groove, a land, and a piston skirt based on the fourth datum plane.

23. A method of making a piston, comprising:
preparing a piston blank having a cast upper crown with an unmachined top surface and an unmachined combustion bowl; and
machining the piston by establishing the unmachined top surface or unmachined combustion bowl as a datum surface and then machining at least a portion of the piston other than the unmachined top surface or the unmachined combustion bowl.

24. The method as set forth in claim 23 wherein the unmachined combustion bowl includes at least one irregularity spaced radially from a central axis of the piston and extending less than entirely circumferentially around the central axis or non-uniformly circumferentially around the central axis.

25. The method as set forth in claim 24 wherein the at least one irregularity is a projection.

26. The method as set forth in claim 24 wherein the at least one irregularity is a recess.

27. A piston, comprising:
an upper crown portion that is fabricated of cast metal having a top surface and a combustion bowl;
a lower crown portion having a piston skirt and at least one pin boss fabricated as one-piece; and
wherein said piston has machined surfaces and unmachined surfaces and wherein said unmachined surfaces include at least said combustion bowl.

28. The piston as set forth in claim 27 wherein said top surface of said upper crown portion is an unmachined surface.

29. The piston as set forth in claim 27 wherein said combustion bowl in said as-cast condition includes at least one irregularity spaced radially from a central axis.

30. The piston as set forth in claim 29 wherein said at least one irregularity includes at least one projection.

31. The piston as set forth in claim 29 wherein said at least one irregularity includes at least one recess.

* * * * *